United States Patent
Serre et al.

(10) Patent No.: US 11,426,704 B2
(45) Date of Patent: Aug. 30, 2022

(54) METAL ORGANIC FRAMEWORKS FOR THE CAPTURE OF VOLATILE ORGANIC COMPOUNDS

(71) Applicants: CENTRE NATIONAL DE LA RECHERCHE SCIENTIFIQUE, Paris (FR); ÉCOLE NORMALE SUPÉRIEURE DE PARIS, Paris (FR); ÉCOLE SUPÉRIEURE DE PHYSIQUE ET DE CHIMIE INDUSTRIELLES DE LA VILLE DE PARIS, Paris (FR); UNIVERSITÉ DE VERSAILLES—SAINT-QUENTIN-EN-YVELINES, Versailles (FR); INSTITUTO SUPERIOR TÉCNICO, Lisbon (PT)

(72) Inventors: Christian Serre, Plaisir (FR); Moisés L. Pinto, Lisbon (PT)

(73) Assignees: CENTRE NATIONAL DE LA RECHERCHE SCIENTIFIQUE, Paris (FR); ECOLE NORMALE SUPERIEURE DE PARIS, Paris (FR); ECOLE SUPERIEURE DE PHYSIQUE ET DE CHIMIE INDUSTRIELLES DE LA VILLE DE PARIS, Paris (FR); UNIVERSITÉ DE VERSAILLES—SAINT-QUENTIN-EN-YVELINES, Versailles (FR); INSTITUTO SUPERIOR TÉCNICO, Lisbon (PT)

( * ) Notice: Subject to any disclaimer, the term of this patent is extended or adjusted under 35 U.S.C. 154(b) by 251 days.

(21) Appl. No.: 16/646,357

(22) PCT Filed: Sep. 12, 2018

(86) PCT No.: PCT/EP2018/074571
§ 371 (c)(1),
(2) Date: Mar. 11, 2020

(87) PCT Pub. No.: WO2019/053048
PCT Pub. Date: Mar. 21, 2019

(65) Prior Publication Data
US 2020/0269211 A1    Aug. 27, 2020

(30) Foreign Application Priority Data
Sep. 12, 2017 (EP) .................................. 17306170

(51) Int. Cl.
*B01D 53/04* (2006.01)
*B01J 20/22* (2006.01)
*B01J 20/28* (2006.01)

(52) U.S. Cl.
CPC ............ *B01J 20/226* (2013.01); *B01D 53/04* (2013.01); *B01J 20/28054* (2013.01);
(Continued)

(58) Field of Classification Search
CPC .. B01D 53/02; B01D 53/04; B01D 2253/204; B01D 2253/306; B01D 2253/308;
(Continued)

(56) References Cited

U.S. PATENT DOCUMENTS

2008/0190289 A1    8/2008 Muller
2014/0311507 A1    10/2014 Bromberg
(Continued)

OTHER PUBLICATIONS

Armin Taheri, "Methyl Mercaptan Removal from Natural Gas using MIL-53 (AL)", Journal of Natural Gas Science and Engineering, 38, 2017, 272-282.
(Continued)

*Primary Examiner* — Frank M Lawrence, Jr.
(74) *Attorney, Agent, or Firm* — Cantor Colburn LLP

(57) ABSTRACT

The use of porous crystalline solids constituted of a metal-organic framework (MOF) for the capture of polar volatile
(Continued)

a)

b)

organic compounds (VOCs). In particular, the MOF of interest are material having an average pores sizes of 0.4 to 0.6 nm and an hydrophobic core formed by a metal oxide and/or hydroxide network connected by linkers, the linkers being selected from the group including (i) $C_6$-$C_{24}$ aromatic polycarboxylate linkers, such as benzyl or naphtyl di-, tri- or tetracarboxylate, and (ii) $C_6$-$C_{16}$ polycarboxylate aliphatic linkers; the linkers bearing or not apolar fluorinated groups, e.g. —$(CF_2)n$—$CF_3$ groups, n being a integer from 0 to 5, preferably 0 ou 3, and/or apolar $C_1$-$C_{20}$ preferably $C_1$-$C_4$ alkyl groups, e.g. —$CH_3$ or —$CH_2$—$CH_3$, grafted directly to the linkers and pointing within the pores of the MOF. The MOF solids used in the present invention can be used for the purification of air, for example for the capture of polar VOCs like acetic acid and aldehydes from indoor air in cars, museums and archives, much more efficiently than common adsorbents, particularly in presence of above normal levels of humidity. They can in particular be used for the preservation of cultural heritage.

17 Claims, 6 Drawing Sheets

(52) U.S. Cl.
CPC .. *B01D 2253/204* (2013.01); *B01D 2253/306* (2013.01); *B01D 2253/308* (2013.01); *B01D 2257/708* (2013.01); *B01D 2258/06* (2013.01); *B01D 2259/4508* (2013.01); *B01D 2259/4566* (2013.01)

(58) Field of Classification Search
CPC .......... B01D 2257/708; B01D 2258/06; B01D 2259/4508; B01D 2259/4566; B01J 20/226; B01J 20/28054

USPC ............... 95/141; 96/108; 502/400, 401
See application file for complete search history.

(56) References Cited

U.S. PATENT DOCUMENTS

| 2017/0036993 | A1  | 2/2017  | Sidheswaran |
|---|---|---|---|
| 2020/0094187 | A1* | 3/2020  | Yeung ..................... B01J 37/08 |
| 2020/0338493 | A1* | 10/2020 | Perera .................... B01D 53/02 |
| 2020/0376426 | A1* | 12/2020 | Tai ..................... B01J 20/28042 |
| 2021/0121864 | A1* | 4/2021  | Liu .................... B01D 53/8668 |

OTHER PUBLICATIONS

International Search Report for corresponding application PCT/EP2018/074571 filed Sep. 12, 2018; dated Nov. 13, 2018.
Kevin Dedecker, "Metal-Organic Frameworks for Cultural Heritage Preservation: The Case of Acetic Acid Removal", ACS Publications, 2018 American Chemical Society, 13886-13894.
Matthew T. Luebbers, "Adsorption Behavior of Volatile Organic Compounds in Metal-Organic Framworks", 2010, Dissertation, Doctor Philosophy in Chemical Engineering.
Mays Alhamani, "A Review on Breathing Behaviors of Metal Organic Frameworks (MOFs) for Gas Adsorption", Materials 2014, 7 3198-3250.
Nicolas Chanut, "Screening the Effect of Water Vapour on Gas Adsorption Performance: Application to CO2 Capture from Flue Gas in Metal-Organic Frameworks", ChemSusChem, 2017, 10, 1543-1553.
Tianjiao Wu, "Enhancing the Stability of Metal-Organic Frameworks in Humid Air by Incorporating Water Repellent Function Groups", Chemical Communication, 2010, 46, 6120-6122.
Written Opinion for corresponding application PCT/EP2018/074571 filed Sep. 12, 2018; dated Nov. 13, 2018.

\* cited by examiner

METAL ORGANIC FRAMEWORKS FOR THE CAPTURE OF VOLATILE ORGANIC COMPOUNDS

CROSS REFERENCE TO RELATED APPLICATIONS

This application is the U.S. national stage of International Patent Application Number PCT/EP2018/074571 filed on Sep. 12, 2018 which claims priority to European Patent Application n° EP 17306170.6 filed on 12 Sep. 2017, the entire contents of which said applications are hereby incorporated by reference.

TECHNICAL FIELD

The present disclosure relates, inter alia, to the use of porous crystalline solids constituted of a metal-organic framework (MOF) for the capture of polar volatile organic compounds (VOCs).

The MOF solids of the present disclosure can be used for the purification of air, for example for the capture of polar VOCs like acetic acid and aldehydes from indoor air in cars, museums and archives, much more efficiently than common adsorbents, particularly in presence of above normal levels of humidity. They can in particular be used for the preservation of cultural heritage.

BACKGROUND

It is commonly admitted that polar VOCs like acetic acid or acetaldehydes are significant pollutants inside cars, museums and archives. For example, in museums, polar VOCs need to be controlled, as reported for example in N. Blades et al., *Guidelines on Pollution Control in Heritage Buildings*, The Council For Museums, Archives And Libraries, London, 2000. Cultural heritage conservation at museums and historical buildings depends indeed on the limitation of acetic acid pollution in indoor air and inside showcases, as reported for example in D. Thickett et al. in *Met. 98 Proc. Int. Conf. Met. Conserv.* (Eds.: W. Mourey, L. Robbiola), James & James, London, 1998, pp. 260-264, and V. Kontozova et al. in *Proc. art* 2002 *7th Int. Conf. Nondestruct. Test. Microanal. Diagnostics Conserv. Cult. Environ. Herit.* (Eds.: R. Van Grieken, K. Janssens, L. Van't clack, G. Meersman), University Of Antwerp, Antwerp, 2002 [2,3]. This volatile organic pollutant causes reduction in the degree of polymerization of cellulose in paper, corrosion of lead-containing alloys and other metals, and degrade calcareous materials (stones, ceramics), as disclosed for example in B. Krupinska, R. Van Grieken, K De Wael, *Microchem. J.* 2013, 110, 350. It may be readily formed from the degradation of woods, as reported in L. T. Gibson et al., *Corros. Sci.* 2010, 52, 172 and, thus, complete elimination of sources is often difficult, if not impossible, and regular monitoring the acetic acid concentration in air is being proposed, as reported for example in T. Prosek et al. *Corros. Sci.* 2014, 87, 376.

A very low maximum average concentration of acetic acid of 400 and 40 ppb for a 1- and 100-year preservation target, respectively, for museum, gallery, library, and archival collections has been proposed in American Society of Heating Refrigeration and Air Conditioning Engineers, in *Heating, Vent. Air-Conditioning Appl.*, ASHRAE, Atlanta, 2003.

One option for its removal is the use of adsorbent materials at museums. Classic adsorbents, like zeolites and activated carbons, have been much applied to capture volatile organic compounds. However, acetic acid poses additional challenges comparing with other less acidic compounds, due to the competitive adsorption of water under conventional humidity conditions of storage of cultural artefacts (which are above normal humidity conditions, around 40% RH). Zeolites can have very polar surfaces to strongly interact with acetic acid, but they are then readily saturated with water at very low humidity levels, as reported in M. L. Pinto, et al., *Adsorption* 2003, 9, 303. On the contrary, activated carbons are usually more hydrophobic than zeolites and are not saturated with water at relative humidity above 60%, but they do not strongly bind acetic acid.

Metal-organic frameworks are a versatile class of porous hybrid crystalline architectures, developed in the last decades, made from the association of inorganic moieties and polycomplexing organic linkers, forming micro or mesoporous materials whose pore size, shape, surface area and hydrophilic/hydrophobic balance can be tuned for a wide range of potential applications. In the field of adsorption, the benefits of MOFs exhibiting active sites, like Lewis, Bronsted or redox or functional polar or apolar groups from the organic linkers, to interact specifically with polar or quadrupolar molecules, e.g. CO, NO or $CO_2$, to enhance the selectivity towards more inert species (e.g. alkanes) can be underlined. But nothing efficient has been reported yet about MOFs for efficiently capturing VOCs like acetic acid or acetaldehydes, especially in above normal humid environments. Further, there are still concerns about the chemical and mechanical stability of this class of materials.

Therefore, there remains a need for finding stable means for capturing efficiently polar VOCs like acetic acid or acetaldehydes from indoor air in cars, museums and archives, especially in above normal humid environments, that outperform those of all the reported so far, and that allow to preserve cultural heritages.

DETAILED DESCRIPTION

To address this need, extensive research have been conducted by present inventors in order to find specific MOFs that are capable to very efficiently adsorb polar VOCs like acetic acids or formaldehydes, even in above normal humid environments.

Before addressing the description of the disclosure itself, in order to facilitate an understanding of the present disclosure, a number of terms and phrases are defined here:

As used herein other than the claims, the terms "a," "an," "the," and/or "said" means one or more. As used herein in the claim(s), when used in conjunction with the words "comprise," "comprises" and/or "comprising," the words "a," "an," "the," and/or "said" may mean one or more than one. As used herein and in the claims, the terms "having," "has," "is," "have," "including," "includes," and/or "include" has the same meaning as "comprising," "comprises," and "comprise." As used herein and in the claims "another" may mean at least a second or more. As used herein and in the claims, "about" refers to any inherent measurement error or a rounding of digits for a value (e.g., a measured value, calculated value such as a ratio), and thus the term "about" may be used with any value and/or range.

The phrase "a combination thereof" "a mixture thereof" and such like following a listing, the use of "and/or" as part of a listing, a listing in a table, the use of "etc" as part of a listing, the phrase "such as," and/or a listing within brackets with "e.g.," or i.e., refers to any combination (e.g., any sub-set) of a set of listed components, and combinations and/or mixtures of related species and/or embodiments described herein though not directly placed in such a listing are also contemplated. Such related and/or like genera(s), sub-genera(s), specie(s), and/or embodiment(s) described herein are contemplated both in the form of an individual component that may be claimed, as well as a mixture and/or a combination that may be described in the claims as "at least one selected from," "a mixture thereof" and/or "a combination thereof."

In general, the term "substituted" whether preceded by the term "optionally" or not, and substituents contained in formulae of this disclosure, refer to the replacement of hydrogen radicals in a given structure with the radical of a specified substituent. When more than one position in any given structure may be substituted with more than one substituent selected from a specified group, the substituent may be either the same or different at every position. As used herein, the term "substituted" is contemplated to include all permissible substituents of organic compounds.

As used herein, the term "about" refers to a variation of ±5 of the value specified. For example, "about 50" percent can in some embodiments carry a variation from 45 to 55 percent. As used herein, the term "and/or" means any one of the items, any combination of the items, or all of the items with which this term is associated.

As will be understood by the skilled artisan, all numbers, including those expressing quantities of ingredients, properties such as cavity/pore size and BET specific surface area, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible subranges and combinations of subranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

One skilled in the art will also readily recognize that where members are grouped together in a common manner, such as in a Markush group, the disclosure encompasses not only the entire group listed as a whole, but each member of the group individually and all possible subgroups of the main group. Additionally, for all purposes, the disclosure encompasses not only the main group, but also the main group absent one or more of the group members. The disclosure therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

As used herein, the expression "three-dimensional structure" is understood to mean a three-dimensional sequence or repetition of units or subvariants, as is conventionally understood in the field of MOF materials, that are also characterized as "organometallic polymers".

As used herein, the term "solid" refers to any type of crystalline material. Said solid may be, for example, in the form of crystals, powder or particles of varied forms, for example of spherical, lamellar, etc. form. The particles may be in the form of nanoparticles.

As used herein, "humid environment" means an atmosphere environment comprising water vapor. It can be the air with water vapor. The amount of water vapor present in the environment, e.g. air, increases as the temperature increases. The differences in the amount of water vapor in a parcel of air can be quite large. For example, a parcel of air that is near saturation may contain 28 grams of water per cubic meter of air at 30° C., but only 8 grams of water per cubic meter of air at 8° C. Water vapor or vapour or aqueous vapor is the gaseous phase of water. It is one state of water within the hydrosphere. Under typical atmospheric conditions, water vapor is continuously generated by evaporation and removed by condensation. The vapor content of air may be measured with devices known as hygrometers. In the present disclosure, the amount of water vapor in the environment, e.g. air, may be from above dry air to saturation, for example from 10 to 30° C., for example at room temperature, i.e. at a temperature between 18° C. and 28° C. As used herein, the term "above normal humid environment" refers to a humidity level of an environment, as defined above, that is above the conventionally accepted threshold for normal humid environment for human comfort. This "normal humidity" threshold is typically around 25-30% humidity. Cf. Ashrae Fundamentals Handbook, SI Edition, 2001, p. 24.5. [34] In the context of the present disclosure, an above normal humid environment refers to >30% relative humidity, preferably ≥35% relative humidity, still preferably ≥40% relative humidity, up to 100% relative humidity. Indoor environments such as museums, galleries, libraries, and archival collections are conventionally associated with above normal relative humidity levels around 40% RH. The additional constraint for best preservation of the items stored in these places is a low maximum average concentration of acetic acid, typically between 400 and 40 ppb.

MOFs are constructed from bridging organic ligands, also named "linkers" or "linker" or "spacers" or "spacer" that remain intact throughout the synthesis, these ligands acting as linkers in the network of the obtained MOF structure. As used herein, the term "ligand" or "linker" or "spacer" refers to a ligand coordinated to at least two metals, which participates in providing distance between these metals and in forming empty spaces or pores, named also "core" in the MOF.

The present inventors have shown through the present disclosure, that it is possible to strongly enhance the capture efficiency and confinement of the VOCs, especially polar VOCs like acetic acids or formaldehydes, even in an above normal humid environment, by using a particular selection of hydrophobic MOFs, having a controlled pore size and built up from particular polycarboxylic alkyl or aromatic linkers, e.g. benzyl or naphtyl dicarboxylate, and/or including grafted hydrophobic perfluoro, e.g. CF3, or alkyl, e.g.

C1-C3, groups pointing within the pores of the MOF and grafted directly on the linkers or aromatic spacers.

In particular, the present disclosure relates to the use of a porous Metal-Organic Framework (MOF) material, for the adsorption of polar volatile organic compounds, comprising an average pore size of 0.4 to 0.6 nm and an hydrophobic core formed by a metal oxide and/or hydroxide network connected by linkers, said linkers being selected from the group comprising:

$C_6$-$C_{24}$ aromatic polycarboxylate linkers, such as benzyl or naphtyl di-, tri- or tetracarboxylate, and $C_6$-$C_{16}$ polycarboxylate aliphatic linkers;

the linkers bearing or not apolar fluorinated groups, e.g. —$(CF_2)_n$—$CF_3$ groups, n being an integer from 0 to 5, preferably 0 ou 1, and/or apolar $C_1$-$C_{20}$ preferably $C_1$-$C_4$ alkyl groups, e.g. —$CH_3$ or —$CH_2$—$CH_3$, grafted directly to the linkers and pointing within the pores of the MOF.

The MOF linker may be a $C_4$-$C_{16}$ polycarboxylate alkyl linkers (such as di-, tri- or tetracarboxylate or carboxylic acid linkers, for example $C_2H_2$($CO_2^-$)$_2$ (fumarate), $C_2H_4$($CO_2^-$)$_2$ (succinate), $C_3H_6$($CO_2^-$)$_2$ (glutarate), ($C_4H_4$)($CO_2^-$)$_2$ (muconate), $C_4H_8$($CO_2^-$)$_2$ (adipate)), optionally bearing apolar fluorinated groups, e.g. —$(CF_2)_n$—$CF_3$ groups, n being a integer from 0 to 5, preferably 0 ou 1, and/or apolar $C_1$-$C_{20}$ preferably $C_1$-$C_4$ alkyl groups, e.g. —$CH_3$ or —$CH_2$—$CH_3$, grafted directly to the linkers and pointing within the pores of the MOF.

The MOF linker may be an imidazole-based linker (such as in ZIF-8 MOF material), optionally bearing apolar fluorinated groups, e.g. —$(CF_2)_n$—$CF_3$ groups, n being a integer from 0 to 5, preferably 0 ou 1, and/or apolar $C_1$-$C_{20}$ preferably $C_1$-$C_4$ alkyl groups, e.g. —$CH_3$ or —$CH_2$—$CH_3$, grafted directly to the linkers and pointing within the pores of the MOF.

Advantageously, the present disclosure provides the use of a porous Metal-Organic Framework (MOF) material, as defined above, for the adsorption of polar volatile organic compounds present at a concentration in the range of 10 ppb to 100 ppm in a gaseous environment, such as air, with >30% relative humidity, preferably ≥35% relative humidity, still preferably ≥40% relative humidity. The porous Metal-Organic Framework (MOF) material, as defined above, may even be used for the adsorption of polar volatile organic compounds present at a concentration as low as 10 ppb to 10 ppm in a gaseous environment, such as air, at above normal relative humidity levels (e.g. >30% RH, preferably ≥35% RH, still preferably ≥40% RH).

As used herein, the term "average pore size" will be understood to refer to the MOF pore size (or pore diameter), as conventionally used in the art, as calculated by the nitrogen adsorption method. It is meant to encompass the various possible pore geometries of the MOF material 'e.g., tetrahedral, octahedral). Methods for measuring the pore size are well documented in the literature. Cf. Rouquérol, F.; Rouquérol, J.; Sing, K. Adsorption by powders and porous solids; Academic Press: San Diego, 1999. [39] For example, the MOF pore size may be determined by calculation of the pore size distributions from nitrogen adsorption. Alternatively, maximum and limiting pore sizes may be estimated from crystallographic data by simulating the filling of the pores with gas molecules (L. Sarkisov and A. Harrison, Mol. Simul., 2011, 37, 1248-1257 [40]) that allow the calculation of average pore sizes.

The present disclosure relates also to a process for adsorbing polar volatile organic compounds present in an environment comprising the step of contacting with said environment a porous Metal-Organic Framework (MOF) material, for the adsorption of polar volatile organic compounds, comprising an average pores sizes of 0.4 to 0.6 nm and an hydrophobic core formed by a metal oxide and/or hydroxide network connected by linkers, said linkers being selected from the group comprising:

$C_6$-$C_{24}$ aromatic polycarboxylate linkers, such as benzyl or naphtyl di-, tri- or tetracarboxylate, and $C_6$-$C_{16}$ polycarboxylate aliphatic linkers;

the linkers bear or not apolar fluorinated groups, e.g. —$(CF_2)_n$—$CF_3$ groups, n being a integer from 0 to 5, preferably 0 ou 1, and/or apolar $C_1$-$C_{20}$ preferably $C_1$-$C_4$ alkyl groups, e.g. —$CH_3$ or —$CH_2$—$CH_3$, grafted directly to the linkers and pointing within the pores of the MOF.

As mentioned above, the MOF linker may be a $C_4$-$C_{16}$ polycarboxylate alkyl linkers (such as di-, tri- or tetracarboxylate or carboxylic acid linkers, for example $C_2H_2$($CO_2^-$)$_2$ (fumarate), $C_2H_4$($CO_2^-$)$_2$ (succinate), $C_3H_6$($CO_2^-$)$_2$ (glutarate), ($C_4H_4$)($CO_2^-$)$_2$ (muconate), $C_4H_8$($CO_2^-$)$_2$ (adipate)), optionally bearing apolar fluorinated groups, e.g. —$(CF_2)_n$—$CF_3$ groups, n being a integer from 0 to 5, preferably 0 ou 1, and/or apolar $C_1$-$C_{20}$ preferably $C_1$-$C_4$ alkyl groups, e.g. —$CH_3$ or —$CH_2$—$CH_3$, grafted directly to the linkers and pointing within the pores of the MOF.

In another example, the linker may be an imidazole-based linker (such as in ZIF-8 MOF material), optionally bearing apolar fluorinated groups, e.g. —$(CF_2)_n$—$CF_3$ groups, n being a integer from 0 to 5, preferably 0 ou 1, and/or apolar $C_1$-$C_{20}$ preferably $C_1$-$C_4$ alkyl groups, e.g. —$CH_3$ or —$CH_2$—$CH_3$, grafted directly to the linkers and pointing within the pores of the MOF.

Advantageously, the apolar fluorinated groups may all be covalently bonded to the ligands from the MOF structures. Alternatively, the apolar fluorinated groups may be grafted directly on the metal clusters. In yet another alternative, the MOF pores could be impregnated with molecules bearing apolar fluorinated groups, that could stay on the pores, being poorly volatile at room temperature. Teachings of these different methods may be found for example in the following references:

Coordination to the Open Metal Sites:

Hwang, Y. K.; Hong, D.-Y.; Chang, J.-S.; Jhung, S. H.; Seo, Y.-K.; Kim, J.; Vimont, A.; Daturi, M.; Serre, C.; Férey, G. Amine grafting on coordinatively unsaturated metal centers of MOFs: consequences for catalysis and metal encapsulation. Angew. Chem. Int. Ed. 2008, 47 (22), 4144-4148. [35]

Exchange of Cation and Ligand After the Synthesis of MOFs:

Kim, M.; Cahill, J. F.; Fei, H.; Prather, K. A.; Cohen, S. M. Postsynthetic Ligand and Cation Exchange in Robust Metal-Organic Frameworks. J. Am. Chem. Soc. 2012, 134 (43), 18082-18088. [36]

MOFs Postsynthetic Modifications:

a) Zhou, H.-C. "Joe"; Kitagawa, S. Metal-Organic Frameworks (MOFs). Chem. Soc. Rev. 2014, 43 (16), 5415-5418; [37] and b) Tanabe, K. K.; Cohen, S. M. Postsynthetic modification of metal-organic frameworks—a progress report. Chem. Soc. Rev. 2011, 40 (2), 498-519. [38]

Advantageously, the polar volatile organic compounds may be selected in the group comprising acetic acid, acetaldehyde, formaldehyde or a mixture of two or three thereof. These polar volatile organic compounds may be adsorbed according to the present disclosure even in above normal humid or moisted environments, even far above the 40% relative humidity found in museums, as shown in the examples below.

Advantageously, the $C_6$-$C_{24}$ aromatic polycarboxylate linkers, such as benzyl or naphtyl di-, tri- or tetracarboxylate may be selected from the group comprising $C_6H_4(CO_2^-)_2$ (terephtalate), $C_{10}H_6(CO_2^-)_2$ (naphtalene-2,6-dicarboxylate), $C_{12}H_8(CO_2^-)_2$ (biphenyl-4,4'-dicarboxylate), $C_6H_3(CO_2^-)_3$ (benzene-1,2,4-tricarboxylate), $C_6H_3(CO_2^-)_3$ (benzene-1,3,5-tricarboxylate), $C_{24}H_{15}(CO_2^-)_3$ (benzene-1,3,5-tribenzoate), $C_6H_2(CO_2^-)_4$ (benzene-1,2,4,5-tetracarboxylate, $C_{10}H_4(CO_2^-)_4$ (naphtalene-2,3,6,7-tetracarboxylate), $C_{10}H_4(CO_2^-)_4$ (naphtalene-1,4,5,8-tetracarboxylate), $C_{12}H_6(CO_2^-)_4$ (biphenyl-3,5,3',5'-tetracarboxylate), and modified analogues selected from 2-methyl terephthalate, 2,5-dimethyl terephtalate, tetramethyl terepthalate, perfluoromethyl terephtalate, diperfluoromethyl terephthalate, 2-chloroterephthalate, 2-bromoterephthalate, 2,5 tetrafluoroterephthalate, tetrafluoroterephthalate, dimethyl-4,4'-biphenyldicarboxylate, tetramethyl-4,4'-biphenyldicarboxylate, dicarboxy-4,4'-biphenyldicarboxylate, azobenzene dicarboxylate, or azobenzene tetracarboxylate.

Advantageously, the $C_4$-$C_{16}$ polycarboxylate alkyl linkers, may be di-, tri- or tetracarboxylate or carboxylic acid linkers, for example $C_2H_2(CO_2^-)_2$ (fumarate), $C_2H_4(CO_2^-)_2$ (succinate), $C_3H_6(CO_2^-)_2$ (glutarate), $(C_4H_4)(CO_2^-)_2$ (muconate), or $C_4H_8(CO_2^-)_2$ (adipate).

Advantageously, the above-defined linkers may bear or not apolar fluorinated groups, e.g. —$(CF_2)n$—$CF_3$ groups, n being a integer from 0 to 5, preferably 0 or 1, for example —$CF_3$. The number of the selected apolar fluorinated groups may be from 1 to 3 per linker.

Advantageously, the above-defined linkers may bear or not apolar $C_1$-$C_{20}$, preferably $C_1$-$C_4$, alkyl groups (named herein, e.g. —$CH_3$ or —$CH_2$—$CH_3$, grafted directly to the linkers and pointing within the pores of the MOF. The number of the selected apolar alkyl groups may be from 1 to 3 per linker.

Advantageously, the MOF my bear apolar fluorinated groups as defined above and apolar alkyl groups as defined above.

Advantageously, the metal atom of the metal oxide and/or hydroxide may be selected from Li, Na, Rb, Mg, Ca, Sr, Ba, Sc, Ti, Zr, Ta, Cr, Mo, W, Mn, Fe, Ru, Os, Co, Ni, Pd, Pt, Cu, Au, Zn, Al, Ga, In, Si, Ge, Sn, Bi, Cd, Mn, Tb, Gd, Ce, La, or Cr. Preferably, the MOF material may be a zirconium, zinc, iron, aluminum, chromium or their hydroxide based MOF.

Advantageously, the MOF may for example be selected from the group comprising MIL-140B, MIL-140C, UiO-66-2$CF_3$, UiO-NDC, UiO-66-$(CH_3)_2$, ZIF, for example ZIF-8, MIL-53, MIL-53-$(CF_3)_2$, MIL-69 and MIL-88B-4$CH_3$; preferably from the group comprising MIL-140B, MIL-140C, UiO-66-2$CF_3$, UiO-NDC, UiO-66-$(CH_3)_2$, MIL-53, MIL-53-$(CF_3)_2$, or MIL-88B-4$CH_3$. UiO-NDC (also referred to as "DUT-52") refers to a UiO-type MOF with 1,4-naphthalenedicarboxylate linkers.

MIL-140B and MIL-140C from (Institut Lavoisier) are porous zirconium dicarboxylic MOFs pertaining to the MIL-140(B/C/D) series constructed from Zr oxide chains consisting of $ZrO_7$ polyhedra that are connected in six directions through aromatic dicarboxylate linkers to define triangularly shaped microporous one-dimensional channels. The general formula of the MOF MIL-140B is [$ZrO(O_2C$—$C_{10}H_6$—$CO_2)_6$]. Document V. Guillerm et al. Angew. Chemie Int. Ed. 2012, 51, 9267-9271 discloses these MOFs and examples for protocols for manufacturing the same.

UiO-66-2$CF_3$ and UiO-NDC are both obtained from the MOF UiO-66 (Universitetet i Oslo) of formula [$Zr_6O_4(OH)_4(O_2C$—$C_6H_4$—$CO_2)_6$] made up of [$Zr_6O_4(OH)_4$] clusters with 1,4-benzodicarboxylic acid struts. Document J. H. Cavka et al., J. Am. Chem. Soc., 2008, 130, 13850-13851 [10] discloses examples of protocols to obtain UiO MOFs. UiO-66-2$CF_3$ may for example be obtained by the protocol disclosed in Q. Yang et al. Chem. Commun. 2011, 47, 9603-9605 [11] and S. Biswas et al. Eur. J. Inorg. Chem. 2013, 12, 2154-2160 [12] UiO-NDC (NDC for 1,4-naphthalenedicarboxilic acid), also known in the literature as DUT-52, may for example be obtained by the protocol disclosed in documents V. Guillerm et al. Angew. Chemie Int. Ed. 2012, 51, 9267-9271 and V. Bon et al. CrystEngComm 2013, 15, 9572-9577 [13].

UiO-66-$(CH_3)_2$ is also a metal organic framework made up of [$Zr_6O_4(OH)_4$] clusters with 1,4-benzodicarboxylic acid struts. Document Yuting Huang et al., Enhanced stability and CO2 affinity of a UiO-66 type metal-organic framework decorated with dimethyl groups, Dalton Trans., 2012, 41, 9283-9285 [14] discloses an exemple of protocol that can be used to obtain UiO-66-$(CH_3)_2$.

ZIF (Zeolitic Imidazolate Framework) is a metal organic framework (MOF) made by zinc ions coordinated by four imidazolate rings in the same way as Si and Al atoms are covalently joined by bridging oxygens in zeolites. ZIF, for example ZIF-8, may be prepared by solvothermal or hydrothermal techniques. Document K. Park et al. Proc. Natl. Acad. Sci. 2006, 103, 10186-10191 [15] discloses this MOF and protocols for manufacturing the same.

MIL-53 is a metal organic framework of formula $M(C_8H_3O_4)(OH)$ made of metal III ions (M=Cr, Al, Fe, Ga, In) coordinated by 1,4-benzodicarboxylic acid, which make three-dimensional porous solids built up from chains of corner-sharing $MO_4(OH)_2$ octahedra, connected through 1,4-benzodicarboxylate linkers to define diamond-shaped one-dimensional channels. Documents T. Loiseau, et al. Chem. Eur. J. 2004, 10, 1373-1382 [16] or C. Serre et al. J. Am. Chem. Soc. 2002, 124, 13519-13526 [17] or T. R. Whitfield et al. J. Solid State Sci. 2005, 7, 1096-1103 [18] or E. V. Anokhina et al. J. Am. Chem. Soc. 2005, 127, 15000-15001 [19] disclose example protocols of manufacturing the same. MIL-53 materials can be grafted with functional groups, preferably with perfluoro and alkyl groups on the 1,4-benzodicarboxylate linkers, within the spirit of the present disclosure to strongly enhance the capture efficiency of polar VOCs. Examples of such materials are MIL-53(Fe)—$(CF_3)$ and MIL-53(Fe)—$(CH_3)$ that may be obtained by example protocols disclosed in document T. Devic et al. J. Am. Chem. Soc. 2010, 132 (3), 1127-1136 [20].

MIL-69 is a metal organic framework of formula Al(OH)$(O_2C$—$C_{10}H_6$—$CO_2).H_2O$ made by by using 2,6-naphthalenedicarboxylic acid as a rigid ligand. The crystal structure consists of infinite chains of $AlO_4(OH)_2$ octahedra corner-linked through the µ2-hydroxyl groups and connected by the 2,6-naphthalenedicarboxylate moieties. It results in the formation of flat channels parallel to the chains of aluminum octahedra, running along the c axis. Document T. Loiseau et al., Hydrothermal Synthesis and Crystal Structure of a New Three-Dimensional Aluminum-Organic Framework MIL-69 with 2,6-Naphthalenedicarboxylate (ndc), Al(OH)(ndc)Q$H_2O$, C. R. Chimie, Special Issue on Crystalline and Organized Porous Solids, 8, 765-72 (2005) [21] discloses example protocols of manufacturing the same.

MIL-88B(Fe)-4$CH_3$ is an hexagonal flexible iron(III) dicarboxylate material built up from iron(III) oxocentered trimers of iron octahedra and tetramethyl terephtalate linkers resulting into 1D microporous channels, of pore size close to 6 Ångströms, decorated with methyl groups from the linker and terminal water molecules from the inorganic subunit. Its BET surface area is close to 1500 m²/g while its flexible character is limited to 25% in unit cell volume. The reader may refer to Ramsahye, Naseem; Khuong Trung, Thuy; Scott, Lorna; Nouar, Farid; Devic, Thomas; Horcajada, Patricia; Magnier, Emmanuel; David, Olivier; Serre, Christian; Trens, Philippe "Impact of the flexible character of MIL-88 iron(III) dicarboxylates on the adsorption of n-alkanes" *Chem. Mater.*, 2013, 25, (3), 479-488 for a disclosure of protocols of manufacturing the same. [41]

Advantageously, the MOF may preferably be under a form allowing a large exchange surface between the MOF and the environment where the polar volatile organic compounds have to be captured by adsorption. The MOF may for example be in the form of a powder or granules or embedded in the form of a composite material, embedded in or applied onto the surface of a paper sheet or a polymer or a fiber. For example, document WO2009/123484 [22] published on October 2009 discloses a useful process for producing polyurethane foam filter material with adsorption capabilities that can be used to support the MOF to carry out the present disclosure. Other examples are the electropining of polymer containing MOF particles disclosed in documents M. Rose et al. Adv. Eng. Mater. 2011, 13, 356-360 [23], R. Ostermann at al. Chem. Commun. 2011, 47, 442-444 [24], J. Ren et al. Int. J. Hydrogen Energy 2015, 40, 9382-9387 [25] and M. R. Khan et al. J. Mater. Eng. Perform. 2016, 25, 1276-1283 [26] that give final composite fiber materials with supported MOF that simplify the application of MOF for the adsorption of volatile organic compounds.

A stark advantage of the present disclosure is that the MOFs are specially designed for removing noxious VOC (volatile organic compounds) from air at very low concentrations in the presence of a high concentration of water vapor.

As porous materials, MOFs have been used as adsorbent materials and filters. MOFs can adsorb some significant amount of water and organic compounds such as acetic acid or acetaldehyde as expected from a porous material. For instance, MOFs have been tested to remove saturated amounts of VOC and odors from air to demonstrate the MOFs' high retention capacity. However, no solution exists for the efficient removal of polar VOC at low concentration in above normal humid environments. This is because the competing adsorption of water (a polar molecule) hampers the use of MOFs for adsorbing polar volatile organic compounds that are present in very low concentration. The presence of water strongly influences the adsorption of polar VOC when the concentration of VOC to remove is very low. No solution exists so far. The present disclosure is thus the very first report of a solution to significantly improve conditions to remove polar VOC present in very low concentrations (both in absolute and relative pressures) when water vapor is present in high concentrations. The present disclosure therefore concerns the use of MOFs that are specially designed chemically and structurally for enhanced/ improved adsorption of polar volatile organic compounds present at low concentration in above normal humid environments. The MOFs described in the present document therefore present a good stability to moisture, and renders possible the improved adsorption of polar volatile organic compounds at concentration in the range of 10 ppb to 100 ppm in an environment >30% relative humidity, preferably ≥35% relative humidity, still preferably ≥40% relative humidity, up to 100% relative humidity; or even for the adsorption of polar volatile organic compounds present at a concentration as low as 10 ppb to 10 ppm in a gaseous environment, such as air, at above normal relative humidity levels.

The present disclosure allows advantageously the easy removal of low concentrations of acetic acid from indoor air, even is the presence of above normal water levels in the atmosphere/environment, for example in museums where it poses serious conservation problems. The following experiments and results confirm the benefits of the present disclosure, over existing solutions.

The following representative examples and figures are intended to help illustrate the disclosure, and are not intended to, nor should they be constructed to, limit the scope of the disclosure. Indeed, various modifications of the disclosure and many further embodiments thereof, in addition to those shown and described herein, will become apparent to those skilled in the art from the full contents of this document, including the examples which follow and the references to the scientific and patent literature cited herein. It should further be appreciated that the contents of those cited references are incorporated herein by reference to help illustrate the state of the art.

The following examples contain important additional information, examplification and guidance that can be adapted to the practice of this disclosure in its various embodiments and the equivalents thereof.

EXAMPLES

Figure 1:
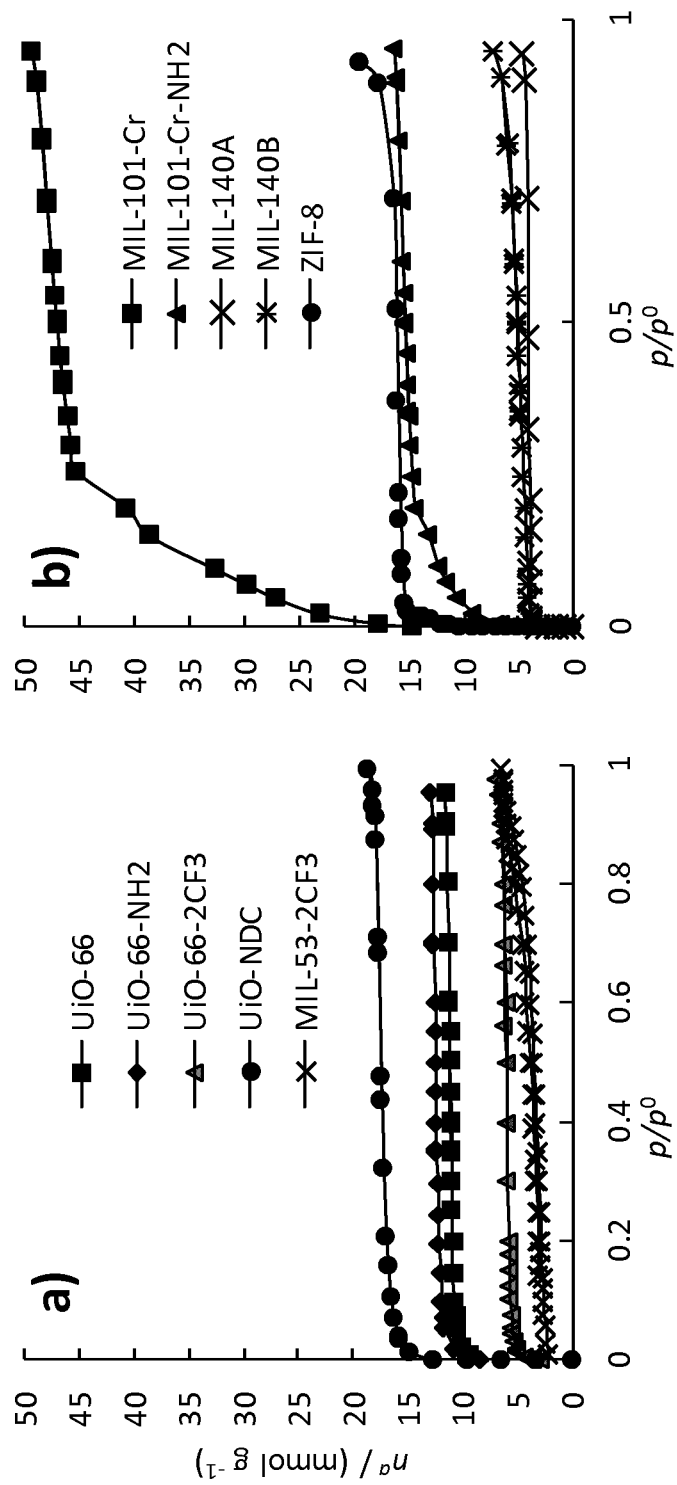
FIG. 1: shows the obtained nitrogen adsorption isotherms, at $-196°$ C., on a) UiO-66, UiO-66-$NH_2$, UiO-66-$2CF_3$ and UiO-NDC and MIL-53(Fe)-$2CF_3$; and b) MIL-101-Cr, MIL-101-Cr—$NH_2$, MIL-140A, MIL-140B and ZIF-8.

According to the present disclosure, the usable MOFs materials and their preparation can be understood further by the examples that illustrate some of the processes by which these materials are prepared or used. It will be appreciated, however, that these examples should not be construed to limit the disclosure. Variations of the disclosure, now known or further developed, are considered to fall within the scope of the present disclosure as described herein and as hereinafter claimed.

Example 1

Materials Synthesis 1.1. MIL-101(Cr): MIL-101(Cr) was obtained via a hydrothermal treatment of a mixture of terephthalic acid (166 mg, 1 mmol), $Cr(NO_3)_3.9H_2O$ (400 mg, 1 mmol), HF (0.2 mL, 1 mmol) and deionized water (4.8 mL, 265 mmol) heated up to 220° C. for 8 h as disclosed in document G. Férey, et al. Science 2005, 309, 2040-2042 [27]. After cooling down the autoclave, a green powder can be removed and washed. Removing the large excess of unreacted terephthalic acid from the powder is performed by following this purification process. First, with a glass filter whose the pore size is between 40 and 100 μm, the solution is filtered off twice to remove insoluble terephthalic acid from the solution. Then, the product is put into an autoclave to be washed with ethanol at 80° C. for 24 h. After this step, the solid is mixed into a solution of 1M of $NH_4F$ at 70° C. for 24 h followed by a filtration and a wash with hot water. The resulting product is then dried overnight at 150° C.

1.2. MIL-101(Cr)-EN: In order to get ethylenediamine grafted MIL-101(Cr), after dehydratation of 0.5 g of MIL-101(Cr) heated at 150° C. for 12 h, the solid was suspended in 30 mL of anhydrous toluene, as disclosed in document Y. K. Hwang, et al. Angew. Chem. Int. Ed. Engl. 2008, 47, 4144-4148 [28]. Afterwards, ethylenediamine (0.05 mL, 0.75 mmol) was added to the suspension and stirred under reflux for 12 h. After the reaction, the material was filtered out, washed with deionized water and ethanol, and dried at room temperature (i.e. in the present examples at a temperature between 18° C. and 28° C.).

1.3. ZIF-8: For the synthesis of ZIF-8, $Zn(NO_3)_2.6H_2O$ (2.933 g, 9.87 mmol) was firstly solubilized in 200 mL of methanol. The same operation was carried out for the ligand by putting 2-methylimidazole (6.489 g, 79.04 mmol) into 200 mL of methanol, as disclosed in document A. Demessence et al., Adsorption properties in high optical quality nanoZIF-8 thin films with tunable thickness, *J. Mater. Chem.*, 2010, 20, 7676-7681 [29]. After the solubilization of the species, the solution with the metal was quickly poured into the ligand mixture under stirring at room temperature (i.e. in the present examples at a temperature between 18° C. and 28° C.). Slowly, the solution became less translucent. After 1 h, the reaction was stopped and the solid was separated from the liquid by centrifugation for 15 min at 20000 rpm. The particles were then washed with absolute ethanol and centrifugated three times to remove the excess of unreacted salt and ligand. The solid was then dried at room temperature (i.e. in the present examples at a temperature between 18° C. and 28° C.) overnight.

1.4. UiO-66: UiO-66(Zr) was synthesized by mixing $ZrCl_4$ (5.825 g, 25 mmol), terephthalic acid (8.300 g, 50 mmol), HCl (1.54 mL, 50 mmol, 37%) in 150 mL of N,N-Dimethylformamide (DMF). The solution was then transferred into a 750 mL Teflon liner and heated overnight at 220° C. in oven. The solid obtained was filtered off, washed with DMF twice followed by two washed with acetone and dried at room temperature (i.e. in the present examples at a temperature between 18° C. and 28° C.).

1.5. UiO-66-$NH_2$: In order to get UiO-66-$NH_2$, a solution composed of $ZrCl_4$ (233 mg, 1 mmol) and 2-aminoterephthalic acid (181 mg, 1 mmol) was prepared in 3 mL of DMF and put into a 23 mL Teflon liner, as disclosed in document C. Gomes Silva, et al. Chem. Eur. J. 2010, 16, 11133-11138 [30]. The mixture was heated in oven at 100° C. for 24 h. The solid was then recovered after filtration and treated with DMF. The material was then left in DMF at room temperature (i.e. in the present examples at a temperature between 18° C. and 28° C.) overnight under stirring. After a new filtration, the solid was washed twice with THF and dried at room temperature (i.e. in the present examples at a temperature between 18° C. and 28° C.).

1.6. UiO-66-$2CF_3$: The synthesis conditions of UiO-66-$2CF_3$ was like to those of UiO-66 previously mentioned. $ZrCl_4$ (582 mg, 2.5 mmol), diperfluoromethyl terephthalic acid (595 mg, 2.5 mmol), HCl (0.077 mL, 2.5 mmol, 37%) were dissolved and mixed in a 125 mL Teflon liner and then heated in oven at 100° C. for 24 h. The obtained product was filtered off followed by two washes with DMF and two others with THF. The product was left at room temperature (i.e. in the present examples at a temperature between 18° C. and 28° C.) overnight for the evaporation of the solvent.

1.7. UiO-NDC: In a 50 mL round-bottom flask, UiO-NDC was obtained by firstly solubilizing 2,6-naphthalenedicarboxylic acid (1.296 g, 6 mmol) in 108 mL of DMF at 90° C. as disclosed in document S. Kaskel et al., Cryst Eng Comm 2013, 15 (45), 9572-9577 [31]. Afterwards, benzoic acid (7.32 g, 60 mmol) and HCl (0.98 mL, 32 mmol, 37%) were put into the solution followed by $ZrCl_4$ (1.398 g, 6 mmol). The mixture was left at 90° C. for 6 h. The solid was separated by centrifugation and washed three times with DMF and twice with EtOH.

1.8. MIL-140A: $ZrCl_4$ (13.980 g, 60 mmol), terephthalic acid (19.96 g, 120 mmol) and acetic acid (34 mL, 600 mmol) were put into a 500 mL round-bottom flask filled with 400 mL of DMF as disclosed in document V. Guillerm et al. Angew. Chemie Int. Ed. 2012, 51, 9267-9271. The solution was kept under reflux and stirring for 6 h. The solid obtained after filtration was washed first with 1 L of DMF at 120° C. for 2 h30, filtrated and washed a last time with 1.5 L of MeOH for 12 h.

1.9. MIL-140B: In a 500 mL round-bottom flask, $ZrCl_4$ (2.77 g, 11.9 mmol), 2,6-naphthalenedicarboxylic acid (7.08 g, 32.8 mmol) and acetic acid (25.5 mL, 450 mmol) were mixed in 430 mL of DMF and kept under reflux for 7 h. The solution was then filtrated and the resulting solid was washed with 200 mL of DMF at 120° C. for 2 h30 followed with filtration and a last wash with 400 mL of MeOH for 12 h to get after filtration the material of interest, MIL-140B.

1.10 MIL-53-$2CF_3$: In a 100 mL Teflon-lined reactor, 0.755 g (2.5 mmol) of 2,5-diperfluoroterephthalic acid, 0.675 g (2.5 mmol) of iron(III) chloride hexahydrate and 25 mL of deionized water were mixed. The resulting mixture is, stirred for ten minutes followed by placing the reactor in a microwave heated to 100° C. for a 20 min period (heating rate 60° C./min). The product is a yellow crystalline solid that can be recovered by centrifugation, and dried in air. The activation was done by heating at 250° C. under vacuum for two days.

Example 2

Materials Characterization

Three series of analysis have been carried out to confirm the obtention of the various materials synthetized in above Example 1:
  nitrogen adsorption at −196° C.;
  PXRD patterns of the synthesized materials; and
  Thermogravimetric analysis of the synthesized materials.

2.1 Nitrogen adsorption at −196° C.: Nitrogen (Air Liquid, 99.999%) adsorption-desorption isotherms were measured at −196° C. using a liquid nitrogen cryogenic bath, in a volumetric automatic apparatus (Micromeritics, ASAP 2010). Prior to the measurement the samples were outgassed at 150° C. for 8 h at a pressure lower than 0.133 Pa.

2.2 PXRD patterns of the synthesized materials: The X-ray powder diffraction patterns were obtained with a high resolution D5000 Siemens X'Pert MDP diffractometer (λCu, Kα1, Kα2) from 5 to 20° (2θ) using a step of 0.02° and 10 s of accumulation per step in continuous mode.

2.3 Thermogravimetric analysis of the synthesized materials: In order to get the TGA profile of each material synthesized, the sample (about 10 mg) were analysed with a gravimetric analyser (Model Perkin Elmer STA 6000) in air at a constant rate of 2° C./min.

All results of these analysis confirm the obtention of the various materials synthetized in example 1.

Example 3

Experiments on Adsorption Capacity of the Different Materials 3.1. Protocol Used for Water Adsorption Measurements The adsorption isotherms of water were determined at 30.0±0.1° C. in an automated apparatus, model Omnisorp 100cx (Coulter, USA), using a fixed dosing method. All samples were outgassed at 150° C. during 4 h at a vacuum lower than $10^{-2}$ Pa. The amounts adsorbed on an empty cell were used to correct the data of the adsorption isotherms.

3.2. Protocol Used for Acetic Acid Adsorption Measurements

Adsorption isotherms of were measured by the volumetric method at low relative pressure, up to 0.06 $p/p^0$, on about 50 mg different samples of the materials synthetized in example 1, each outgassed as described above. Adsorption temperature was maintained with a water bath (Grant GD120) at 25° C. The pressure was measured with a capacitance transducer from Pfeiffer Vacuum (CMR 262). Nonideality of the phase was accounted by the use of the compressibility factor z, expressed as function of the pressure p, given by the equation $z=0.351+0.729 \ p^{-0.176}$, which was obtained by fitting data published in document F. H. MacDougall, *J. Am. Chem. Soc.* 1936, 58, 2585 [32].

3.3. Protocol Used for Acetic Acid Adsorption in a Controlled Relative Humidity Environment About 100 mg of materials were placed inside 10 cm³ glass vials and kept in an oven at 100° C. over night. The vials were removed and closed tightly with polyethylene caps until being used in the experiments. 50 mg of adsorbent material was weighted (Mettler AE240) in a watch glass and immediately placed inside a glass chamber (2.9 dm³) with controlled humidity. The humidity was controlled to about 40% relative humidity by means of a saturated solution of potassium carbonate (BDH Prolabo, 99.6%) in an open petri dish, as disclosed in document L. Greenspan, *J. Res. Natl. Bur. Stand. Sect. A Phys. Chem.* 1977, 81A, 89 [33]. The chamber was flushed with nitrogen flow during 15 minutes and the material was allowed to equilibrate with the humidified atmosphere for 1.5 hour. After this time, a syringe (Hamilton 7001 KH) was used to inject 1 µL of acetic acid (Riedel-de Haën, 99.8%) inside the chamber trough a rubber septum injection port, in the surface of a clean paper filter to improve the spreading and evaporation of the small droplet. Immediately before injection of acetic acid, the humidifier with potassium carbonate was removed to assure that acetic acid removal is only due to the tested MOF. The total volatile organic compounds (TVOC) concentration, temperature and relative humidity inside the chamber were measured (Graywolf TG-502 TVOC ppb) and were recorded at fixed time interval (15 s) during one hour using computer software (Wolfsense LAP). During experiments, the temperature was 22.8±0.8° C. and the relative humidity was 39.6±3.5%. A blank experiment with no injection of acetic acid was preformed and a control experiment was preformed with injection of acetic acid without any MOF to demonstrate the tightness of the chamber during the experiments time frame, and ascertain the TVOC signal response obtained by 1 µL injection.

Example 4

Results of the Analysis 4.1 Nitrogen Adsorption

Annexed FIG. 1 shows the obtained nitrogen adsorption isotherms, at −196° C., on a) UiO-66, UiO-66-NH$_2$, UiO-66-2CF$_3$ and UiO-NDC; and b) MIL-101-Cr, MIL-101-Cr—NH$_2$ MIL-140A, MIL-140B and ZIF-8.

4.2 Acetic Acid Adsorption

Figure 2:
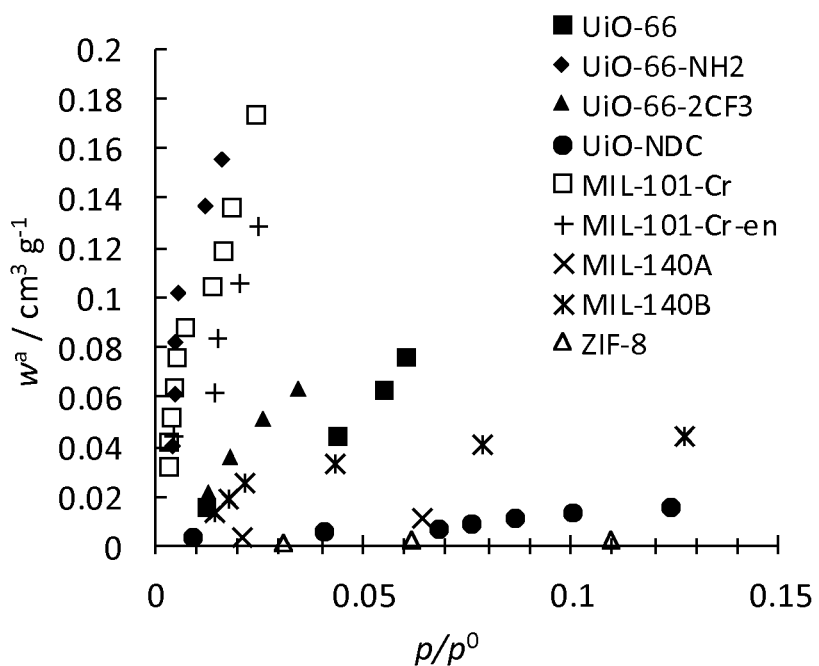
FIG. 2: shows, acetic acid adsorption isotherms, at 25° C., expressed as equivalent liquid adsorbed volume.

Annexed FIG. 2 shows, acetic acid adsorption isotherms, at 25° C., expressed as equivalent liquid adsorbed volume.

Figure 3:
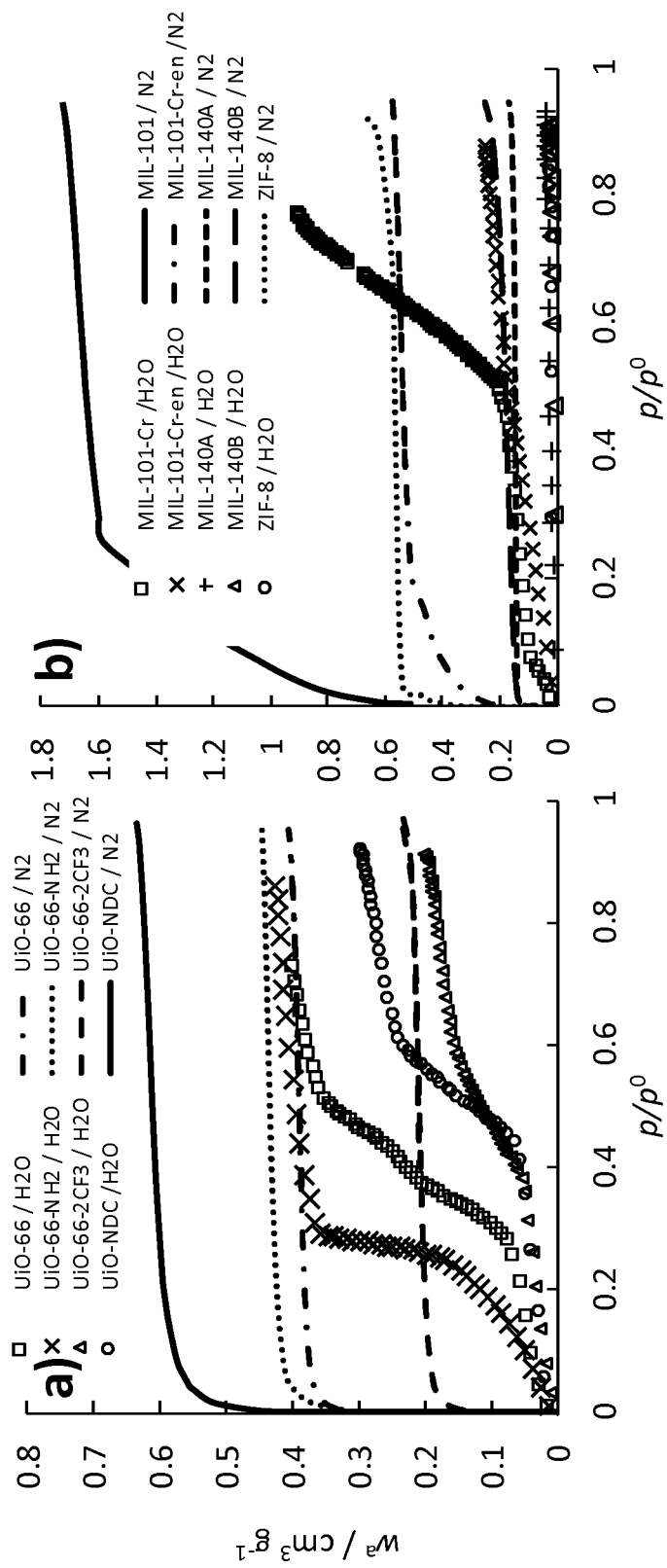
FIG. 3: shows the nitrogen and water adsorption isotherms results, at $-196°$ C. and 30° C. respectively, on: a) UiO-66, UiO-66-$NH_2$, UiO-66-$2CF_3$ and UiO-NDC; and b) MIL-101-Cr, MIL-101-Cr—$NH_2$, MIL-140A and MIL-140B. Adsorbed volume assuming a liquid like state at the adsorption temperature.

4.3 Water Adsorption and Assessment of Hydrophobic/Hydrophilic Character of Surfaces The water adsorption isotherms represented on annexed FIG. 3 display the different hydrophobic/hydrophilic character of the different materials. This figure shows nitrogen and water adsorption isotherms, at −196° C. and 30° C. respectively, on: a) UiO-66, UiO-66-2CF$_3$ and UiO-NDC; and b) MIL-101-Cr, MIL-101-Cr—NH$_2$, MIL-140A and MIL-140B, adsorbed volume assuming a liquid like state at the adsorption temperature. The water amounts adsorbed in each material were not dependent on the pore volume (or surface area), in agreement with the results reported by other authors for some of the studied MOF and demonstrating the strong influence of the chemical nature of the surface on the results. Also, the different shapes of the isotherms indicate this strong influence. For example, for UiO-66 and UiO-66-NH$_2$ that have similar microporous volume and pore sizes, the absorbed amounts at 0.7 $p/p^0$ are very similar (about 22 mmol g$^{-1}$), but the inflection points of both isotherms occur at significantly different relative pressures (FIG. 3). The UiO-66-NH$_2$ exhibit one jump at 0.25 $p/p^0$, while UiO-66 exhibit two consecutive inflection points at 0.35 and 0.45 $p/p^0$. On the contrary, UiO-66-2CF$_3$ displays a lower adsorbed amount than UiO-66 and an inflexion point at about 0.5 $p/p^0$. Such comparison of inflection points in water isotherms proved helpful for evaluating porous materials' hydrophobicity with different types of surface chemistry and can be correlated with the interaction energy of water with the surface. Thus, results indicate that functionalization of UiO-66 with amines decreases the hydrophobicity of the material, while the contrary occurs with the presence of CF$_3$ groups. The changing of benzene to naphthalene dicarboxylate linker increases considerably the hydrophobicity of this type of structure as can be seen from the comparison of the UiO-66 and UiO-NDC isotherms (FIG. 3).

Figure 4:
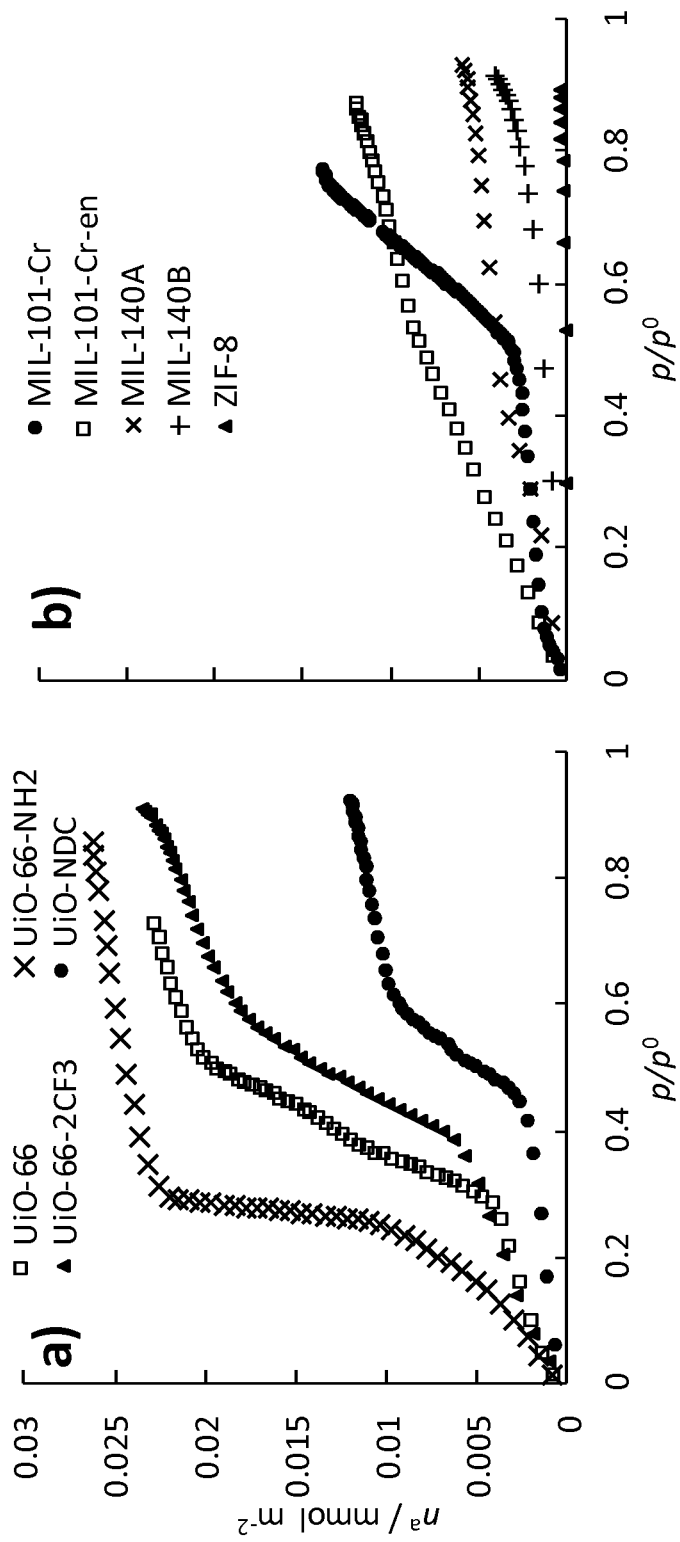
FIG. 4: shows water adsorption isotherms results, at 30° C., on: a) UiO-66, UiO-66-$NH_2$, UiO-66-$2CF_3$ and UiO-NDC; and b) MIL-101-Cr, MIL-101-Cr—$NH_2$, MIL-140A and MIL-140B, amounts expressed by surface area of each material

Further confirmation of this change in water affinity can be seen if the results are represented as amounts adsorbed by surface area of materials instead of mass, as shown on annexed FIG. 4. FIG. 4 shows water adsorption isotherms, at 30° C., on: a) UiO-66, UiO-66-$NH_2$, UiO-66-$2CF_3$ and UiO-NDC; and b) MIL-101-Cr, MIL-101-Cr—$NH_2$, MIL-140A and MIL-140B, amounts expressed by surface area of each material. This representation is better for comparing the nature of the surface of materials with significantly different specific surface areas. The results depicted in annexed FIG. 4 show that at all the studied materials of the UiO-66 family tend to about the same covering of the surface (between 0.020 and 0.025 mmol $m^{-2}$) at high relative pressures, but they are significantly different below the 0.6 $p/p^0$ pressure region, being UiO-$2CF_3$ the most hydrophobic one (FIG. 4).

In MIL-101-Cr water adsorption isotherm (FIG. 3), an initial step below 0.1 $p/p^0$ attributed to the adsorption of water in the open metal sites and Cr metal clusters is observed, followed by an intermediate plateau. The second inflection is observed at a high relative pressure (between 0.6 to 0.75 $p/p^0$) and the magnitude of the step indicates that most of the surface of the material is hydrophobic. Comparing the amounts adsorbed by surface area on the MIL-101-Cr with those of the UiO-66 family (FIG. 4), it can be concluded that the former is adsorbing much less water per surface. In fact, the nitrogen and water isotherms can be compared considering the adsorbed phase in a liquid like state and use the respective liquid density to compare the adsorbed volumes (FIG. 3). The volumes of water adsorbed on the materials of the UiO-66 type approach those obtained with nitrogen (FIG. 3), although it occurs at different relative pressures for each material. Nevertheless, we can conclude that the micropore volume of these materials become filled with water at pressures above 0.6 $p/p^0$. On the contrary, for MIL-101-Cr it is evident that, even at 0.8 $p/p^0$ (after the second inflection point), the porous volume is still far from being completely filled with water (FIG. 3).

The main differences observed in water adsorption between the MIL-101-Cr—$NH_2$ and the parent MIL-101-Cr are the disappearance of the first inflection point at low pressures and a slow raise in the adsorbed amounts without a defined step at intermediate pressures, for the amine functionalized material. The absence of the first inflection point is most surely related with the presence of the ethylenediamine that occupies the open metal sites, were adsorption occurs at very low pressures. But, the amine groups decrease the hydrophobicity of the material since the adsorbed amounts per surface are higher than those observed for the parent MIL-101-Cr, at intermediate pressures (FIG. 4). Nevertheless, at high pressures the pore volume the MIL-101-Cr—$NH_2$ (FIG. 3) is still not saturated, similarly to the behaviour of MIL-101-Cr. FIG. 4 puts in evidence the more hydrophobic nature of MIL-101-Cr and MIL-101-Cr—$NH_2$ materials in relation to the UiO-66 type materials.

The MIL-140A and MIL-140B adsorb significantly less water amounts than the other tested materials. Even when taking into account the low surface area of this material, the amounts adsorbed per surface are significantly below the other materials, except ZIF-8 (FIG. 4), confirming the hydrophobic nature of these materials, which was studied by infrared techniques. Although they are formed by the same type of metal clusters and linker as UiO-66 and UiO-NDC, the structural features of MIL-140A and MIL-140B renders a much more hydrophobic surface. ZIF-8 presents very low adsorbed amounts confirming the hydrophobic character of this MOF, being the most hydrophobic MOF from the tested samples. This can also be confirmed by the analysis of FIGS. 3 and 4.

4.4 Removal of Acetic Acid with MOFs in the Presence of Moisture

Figure 5:
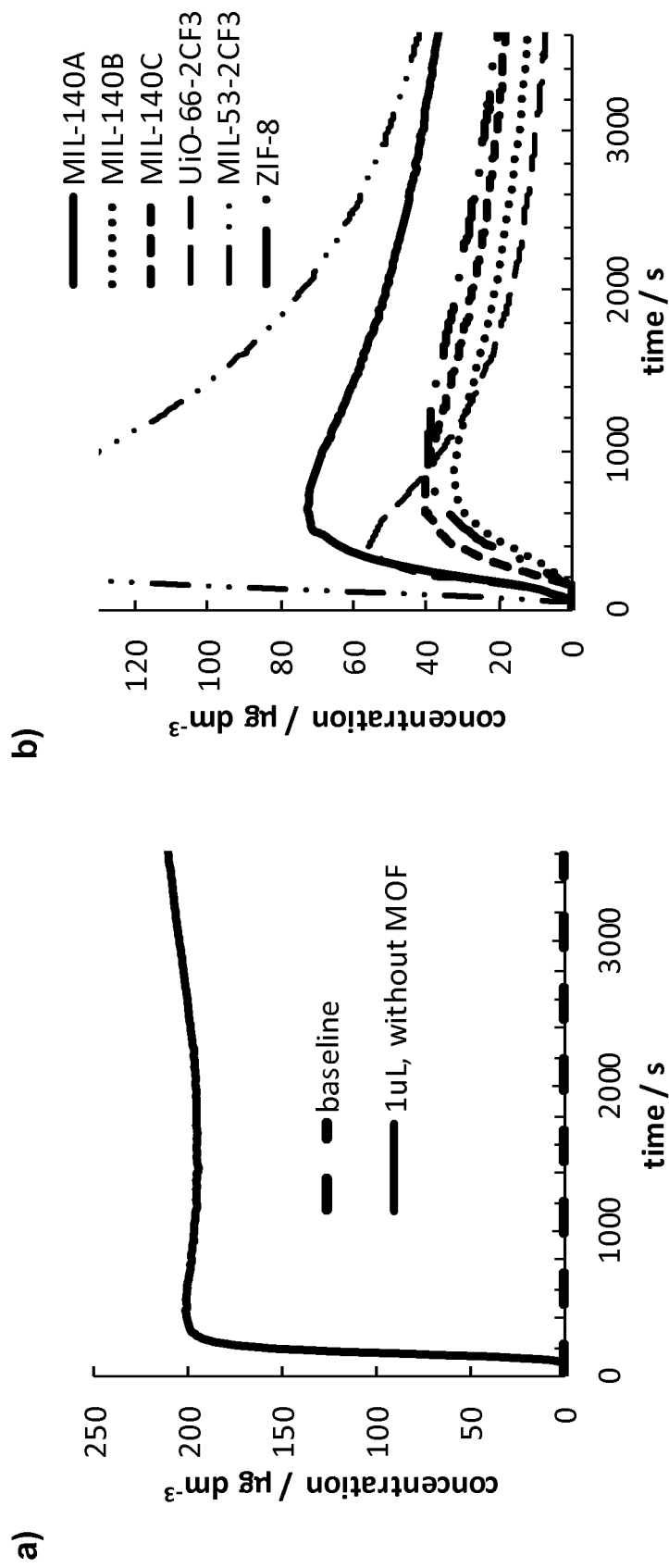
FIG. 5: shows: a) results of a blanc experiments with no injection of acetic acid (baseline) and the injection of acetic acid without the presence of adsorbents. b) results with acetic acid concentration profiles inside a closed chamber after the injection of 1 µL of acetic acid, at 23° C., 40% RH, with the presence of 50 mg of MIL-140A, MIL-140B, MIL-140C, UiO-66-$2CF_3$, MIL-53-$2CF_3$ and ZIF-8.

Annexed FIG. 5 shows: a) Blanc experiments with no injection of acetic acid (baseline) and the injection of acetic acid without the presence of adsorbents. b) Acetic acid concentration profiles inside a closed chamber after the injection of 1 μL of acetic acid, at 23° C., 40% RH, with the presence of 50 mg of MIL-140A, MIL-140B MIL-140C, UiO-66-$2CF_3$ and ZIF-8. Regarding the MIL-140 family of materials, FIG. 5 shows an increase in the efficiency of removal from the MIL-140A to the MIL-140B, because the concentration inside the chamber after one hour is significantly lower in the latter case. When going from the MIL-140B to the larger pores MIL-140C the efficiency of the removal decreases. These results show that MIL-140B have the most suitable properties among the MIL-140 family, by a combination of proper pore size and hydrophobicity, for the removal of acetic acid. FIG. 5b demonstrates the advantage of the presence of the perfluoro methyl groups in the structure of the MOFs. The UiO-66-$2CF_3$ is the most efficient of the cases presented in FIG. 5b, even more than the very hydrophobic ZIF-8. The effect of these groups in MIL-53-$2CF_3$ is only noticed after some time because this structure need to change from the closed pore (initial) to the open pore (final) form. This justifies the sharp rise followed by a sharp decrease in the concentration.

Comparing the Adsorption Isotherm Data with the Data Obtained in the Closed Chamber The Henry's constant reflects the affinity of the MOFs for acetic acid and can be used to estimate adsorbed amounts at very low concentrations. These amounts can be compared with the values estimated in the closed chamber experiments. The values calculated from the concentrations after one hour (assuming equilibrium and no influence from the presence of water) for the best materials (Table 1 below) are ranging from 4.57 to 0.18 μmol $g^{-1}$. Comparing with the amounts deduced from the closed chamber measurements (Table 1), one estimates that ZIF-8 is approaching equilibrium.

Remarkably, the estimations based on the acetic acid isotherm are agreeing fairly with observations preformed under the presence of moisture, probably due to the very hydrophobic character of ZIF-8 which prevents the interference of moisture with the acetic acid adsorption. On the contrary, for UiO-66-$2CF_3$ and MIL140B, differences between the amount estimated from the isotherms and the one measured in the chamber (Table 1) are significant and indicate a strong influence of water on the acetic acid adsorption and that the systems are not close to equilibrium after one hour. In fact, a considerable slope of the concentration profiles inside the chamber at 1 hour is seen, which leads to a drop to 4.2 μg $dm^{-3}$ and 9.5 μg $dm^{-3}$ after 1.5 hour, for UiO-66-$2CF_3$ and MIL140B respectively.

TABLE 1

Comparison of the concentration of acetic acid in the chamber after one hour, respective relative pressure and the adsorbed amounts in the materials.

| Material | Concentration in the chamber after 1 hour μg dm$^{-3}$ | Relative pressure p/p$^0$ | n$^{ads}$ from Henry's constants [a] μmol g$^{-1}$ | n$^{ads}$ from FIG. 1 [b] μmol g$^{-1}$ |
|---|---|---|---|---|
| UiO66-2CF$_3$ | 7.2 | 1.41 × 10$^{-4}$ | 4.57 | 0.20 |
| UiO-NDC | 20.5 | 4.00 × 10$^{-4}$ | 0.83 | 0.18 |
| MIL-140B | 12.2 | 2.38 × 10$^{-4}$ | 4.47 | 0.19 |
| ZIF-8 | 20.2 | 3.94 × 10$^{-4}$ | 0.18 | 0.18 |

[a] Adsorbed amounts in the materials estimated from the Henry's constant, at the relative pressure after one hour, assuming equilibrium and only acetic acid adsorption;
[b] Adsorbed amounts in the materials estimated from the difference between the concentration in the chamber with materials and the blank experiment, after one hour.

4.5 Removal of Acetaldehyde with MOFs in the Presence of Moisture

Figure 6:
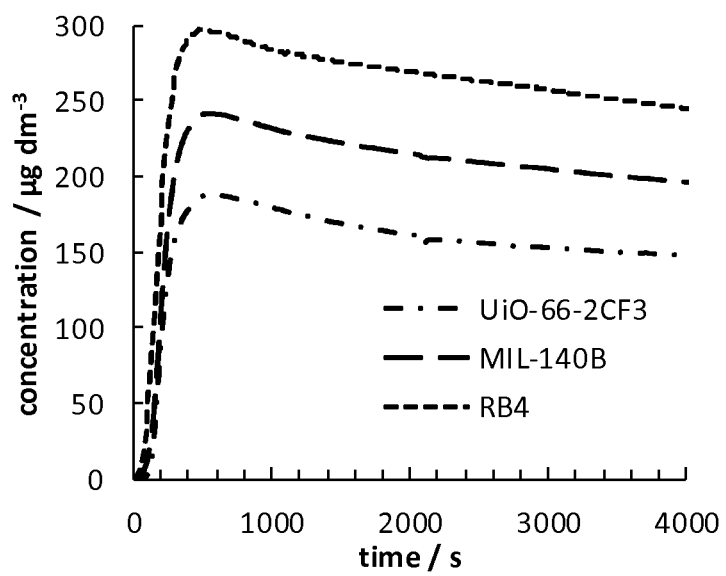
FIG. 6: shows acetaldehyde concentration profiles results inside a closed chamber after the injection of 14 of acetaldehyde, at 23° C., 40% RH, with the presence of 50 mg of UiO-66-$2CF_3$, MIL-140B, and a standard commercial activated carbon RB4. The best results are obtained for MIL-140B and C UiO-66-$2CF_3$.

Annexed FIG. 6 shows acetaldehyde concentration profiles inside a closed chamber after the injection of 14 of acetaldehyde, at 23° C., 40% RH, with the presence of 50 mg of UiO-66-2CF$_3$, MIL-140B, and activated carbon RB4. The best results are obtained for MIL-140B and UiO-66-2CF$_3$.

Example 5

Results

The removal of low concentrations of acetic acid from indoor air at museums poses serious conservation problems that current adsorbents cannot easily solve due to the competitive adsorption of water. In this work, several topical MOFs with different pore sizes, topologies and pending functional groups have been studied to demonstrate what features are more effective to the challenge of capturing this very polar volatile organic compound in the presence of water. Results show that although increasing the hydrophobicity can have a positive effect in the removal efficiency, it is not sufficient if not accompanied by an increased interaction with acetic acid. The two best materials, MIL-140B and UiO-66-2CF$_3$, confirm that two strategies are possible to increase selectively the interaction with acetic acid. For MIL-140B, the hydrophobicity combined with the proper pore width promote the acetic acid adsorption by a confinement effect. In the UiO-66-2CF$_3$, the acetic acid adsorption was enhanced by the introduction of the CF$_3$ groups that increase the hydrophobicity and the interaction with acetic acid.

Example 6

UiO-66-2CH$_3$

Synthesis Procedures

The reaction mixture of 178.13 mg (1 mmol) of Zirconyl chloride octahydrate, (98%), 194.18 mg (1 mmol) of 2,5-Dimethylterephthalic acid (97%) and 3.77 mL (100 mmol) of Formic acid (99%) were dispersed in 8.05 mL (104 mmol) of dimethylformamide (98%). The mixture was placed in a Teflon-lined autoclave (23 mL) for 24 hours at 150° C. Then, the white solid was recovered by centrifugation and washed 3 times with 50 mL of ethanol.

Experimental Section

The X-ray powder diffraction patterns were obtained with a high resolution D5000 Siemens X'Pert MDP diffractometer ($\lambda_{Cu}$, K$\alpha_1$, K$\alpha_2$). Thermogravimetric analysis was performed with a thermogravimetric analyzer (Model Perkin Elmer STA 6000) in air at a constant heating rate of 2° C./min. Transmission IR spectra were measured using Nicolet 6700 spectrometer. Nitrogen physisorption isotherms were measured at T=77K with a Micromeritics 3Flex surface characterisation analyser. Prior to the measurements, the powders (50-80 mg) were outgassed for 6 h at T=373K under a 10$^{-1}$ mbar vacuum.

Results

The successful synthesis of UiO-66-2CH$_3$ was confirmed by powder X-ray diffraction (PXRD) studies. Characteristic peaks at 2θ=7.34°, 8.48° confirm UiO-66 structure. The UiO-66-2CH$_3$ has a face-centered cubic (fcc) unit cell, space group: Fm-3m.

The IR spectrum of UiO-66-2CH$_3$ showed:
- an absorption band at 1574 cm$^{-1}$ indicating the existence of the reaction of COOH with Zr$^{4+}$,
- the aromatic bound C=C from ligand is referred at 1493 cm$^{-1}$ to C=C from aromatic; and
- bands at 2969 and 2933 cm$^{-1}$ representing asymmetric stretchings of methyl groups.

Using thermogravimetric analysis (TGA) the thermal stability of UiO-66-2CH$_3$ was investigated. Three weight loss steps were observed. The first weight loss of 3.4 wt % occurred between 20 and 60° C. due to vaporization of water and ethanol. The second step of weight loss was 4.1 wt % at 60-300° C. due to dehydroxylation of OH$^-$. The third step of weight loss was 49 wt % at 300-550° C. due to decomposition of material.

Figure 7:
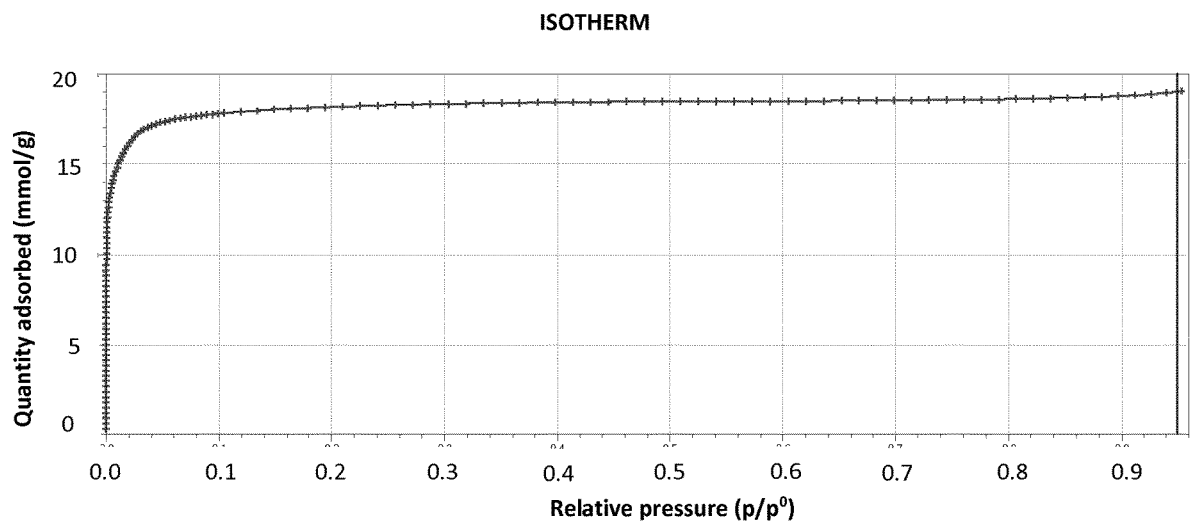
FIG. 7: shows nitrogen adsorption isotherms, at $-196°$ C., of UiO-66-$2CH_3$ of Example 6.

FIG. 7 shows N$_2$ adsorption isotherms collected on the material. BET surface area is 1563±8 m$^2$/g, the maximum pore volume is 0.625566 cm$^3$/g and the median pore width: 5,231 Å. It can be seen that UiO-66-2CH$_3$ presented higher surface area (calculated using the BET theory), than theoretical value 1200 m$^2$/g. The higher surface area can be explained by presence of the defects in the structure, like «missing linker defects» (which incidentally also explains its surface area higher than the bare UiO-66 MOF). The presence of this type of defects is attributed to a high degree of connectivity of the clusters.

Figure 8:
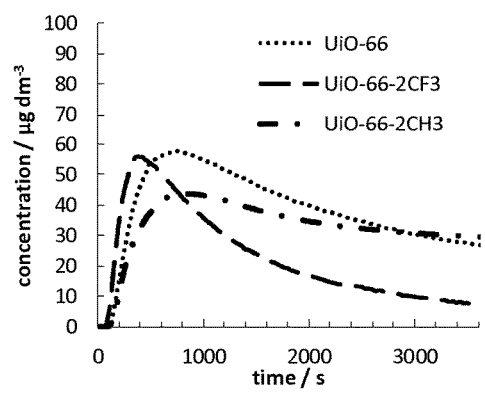
FIG. 8: shows acetic acid concentration profiles results inside a closed chamber after the injection of 1 µL of acetic acid, at 27° C., 40% RH, with the presence of 50 mg of UiO-66-$2CH_3$.

In addition, UiO-66-2CH$_3$ (bearing methyl groups, as compared to UiO-66) enxhibits an enhanced/improved capture performance of acetic acid. FIG. 8 represents the decrease of the acetic acid concentration as a function of time, when 1 μL is injected in the chamber (as in the protocol of example 3, at 27° C.). The UiO-66-2CH$_3$, which is the equivalent structure of UiO-66 but with two methyl groups per linker, therefore presents an advantage over the structure without methyl groups. In addition, the UiO-66-2CH$_3$ material is advantageous due to the easy preparation and consequently lower production costs (the carboxylic acid used for the UiO-66-2CH$_3$ synthesis (terephthalic acid with two methyl substitution on the aromatic ring; (HCO$_2$)$_2$—C$_6$H$_2$—(CH$_3$)$_2$) is available commercially) than the equivalent UiO-66-2CF$_3$ with perfluoro groups instead of methyl groups. The results for UiO-66-2CH$_3$ were obtained at a temperature (27° C.) slightly higher than those for UiO-66 (23° C.), implying that a slightly better comparative performance is expected for UiO-66-2CH$_3$ if the acetic acid capture is performed at the same temperature.

It is proposed that alternative synthesis routes to UiO-66-2CH$_3$ (without inhibitors such as monocarboxylic acids) may lead to a lower defect content, a lower surface area but a more hydrophobic character, that may improve significantly the acetic acid capture of this MOF.

The invention claimed is:

1. A process for adsorbing polar volatile organic compounds present at a concentration in the range of 10 ppb to 100 ppm (volume/volume) in a gaseous environment comprising the step of contacting with said environment a porous Metal-Organic Framework (MOF) material comprising an average pore size of 0.4 to 0.6 nm and an hydrophobic core formed by a metal oxide and/or hydroxide network connected by linkers, said linkers being selected from the group consisting of:
   - $C_6$-$C_{24}$ aromatic polycarboxylate linkers;
   - $C_6$-$C_{16}$ polycarboxylate aliphatic linkers;
   - $C_4$-$C_{16}$ polycarboxylate aliphatic linkers; and
   - imidazole-based linkers;

each of the aforementioned linkers optionally bearing apolar fluorinated groups and/or apolar $C_1$-$C_{20}$ groups grafted directly to the linkers and pointing within the pores of the MOF.

2. The process according to claim 1, wherein the $C_6$-$C_{24}$ aromatic polycarboxylate linkers are selected from the group consisting of $C_6H_4(CO_2^-)_2$ (terephthalate), $C_{10}H_6(CO_2^-)_2$ (naphthalene-2,6-dicarboxylate), $C_{12}H_8(CO_2^-)_2$ (biphenyl-4,4'-dicarboxylate), $C_6H_3(CO_2^-)_3$ (benzene-1,2,4-tricarboxylate), $C_6H_3(CO_2^-)_3$ (benzene-1,3,5-tricarboxylate), $C_{24}H_{15}(CO_2^-)_3$ (benzene-1,3,5-tribenzoate), $C_6H_2(CO_2^-)_4$ (benzene-1,2,4,5-tetracarboxylate, $C_{10}H_4(CO_2^-)_4$ (naphtalene-2,3,6,7-tetracarboxylate), $C_{10}H_4(CO_2^-)_4$ (naphthalene-1,4,5,8-tetracarboxylate), $C_{12}H_6(CO_2^-)_4$ (biphenyl-3,5,3',5'-tetracarboxylate), and modified analogues selected from 2-methyl terephthalate, 2,5-dimethyl terephthalate, tetramethyl terephthalate, perfluoromethyl terephthalate, diperfluoromethyl terephthalate, 2-chloroterephthalate, 2-bromoterephthalate, 2,5-tetrafluoroterephthalate, tetrafluoroterephthalate, dimethyl-4,4'-biphenyldicarboxylate, tetramethyl-4,4'-biphenyldicarboxylate, dicarboxy-4,4'-biphenyldicarboxylate, azobenzene dicarboxylate, and azobenzene tetracarboxylate.

3. The process according to claim 1, wherein the $C_4$-$C_{16}$ polycarboxylate alkyl linkers are selected from di-, tri- and tetracarboxylate or carboxylic acid linkers.

4. The process according to claim 2, wherein the linkers optionally bear apolar fluorinated —(CF$_2$)—CF$_3$ or —CF$_3$ groups grafted directly to the linkers and pointing within the pores of the MOF.

5. The process according to claim 1, wherein the linkers optionally bear —CH$_3$ or —CH$_2$—CH$_3$, groups grafted directly to the linkers and pointing within the pores of the MOF.

6. The process according to claim 1, wherein the metal atom of the metal oxide and/or hydroxide is selected from Li, Na, Rb, Mg, Ca, Sr, Ba, Sc, Ti, Zr, Ta, Cr, Mo, W, Mn, Fe, Ru, Os, Co, Ni, Pd, Pt, Cu, Au, Zn, Al, Ga, In, Si, Ge, Sn, Bi, Cd, Mn, Tb, Gd, Ce, La, and Cr.

7. The process according to claim 1, wherein the MOF is selected from the group consisting of MIL-140B, MIL-140C, UiO-66-2CF$_3$, UiO-NDC, UiO-66-(CH$_3$)$_2$, ZIF, ZIF-8, MIL-53, MIL-69 and MIL-88B-4CH$_3$.

8. The process according to claim 1, wherein the polar volatile organics compounds are selected from the group consisting of acetic acide, acetaldehyde, formaldehyde and a mixture of two or three thereof.

9. The process according to claim 1, wherein the MOF is in the form of a powder or granules or embedded in the form of a composite material, or embedded in or applied onto the surface of a paper sheet or a polymer or a fiber.

10. The process according to claim 1, wherein the gaseous environment is air having >30% relative humidity.

11. The process according to claim 1, wherein the linkers are selected from the group consisting of:
   - $C_6$-$C_{24}$ aromatic polycarboxylate linkers,
   - $C_6$-$C_{16}$ polycarboxylate aliphatic linkers, and
   - $C_4$-$C_{16}$ polycarboxylate aliphatic linkers.

12. The process according to claim 1, wherein the $C_6$-$C_{24}$ aromatic polycarboxylate linkers are benzyl or naphthyl di-, tri- or tetracarboxylates.

13. The process according to claim 1, wherein the apolar fluorinated groups are —(CF$_2$)$_n$—CF$_3$ groups, n being an integer from 0 to 5.

14. The process according to claim 1, wherein the apolar $C_1$-$C_{20}$ groups are $C_1$-$C_4$ alkyl groups.

15. The process according to claim 13, wherein the apolar $C_1$-$C_{20}$ groups are —CH$_3$ or —CH$_2$—CH$_3$.

16. The process according to claim 3, wherein the $C_4$-$C_{16}$ polycarboxylate alkyl linkers are selected from $C_2H_2(CO_2^-)_2$ (fumarate), $C_2H_4(CO_2^-)_2$ (succinate), $C_3H_6(CO_2^-)_2$ (glutarate), $(C_4H_4)(CO_2^-)_2$ (muconate), and $C_4H_8(CO_2^-)_2$ (adipate).

17. The process according to claim 7, wherein the MOF is selected from the group consisting of MIL-140B, MIL-140C, UiO-66-2CF$_3$, UiO-NDC, UiO-66-(CH$_3$)$_2$, MIL-53, and MIL-88B-4CH$_3$.

* * * * *